US011692603B2

(12) United States Patent
Jomaa et al.

(10) Patent No.: US 11,692,603 B2
(45) Date of Patent: Jul. 4, 2023

(54) MOUNT BUSHING WITH INTEGRATED ISOLATED OUTER INSERT FOR ENHANCED HIGH FREQUENCY ISOLATION PERFORMANCE

(71) Applicant: GM GLOBAL TECHNOLOGY OPERATIONS LLC, Detroit, MI (US)

(72) Inventors: Sam Jomaa, Northville, MI (US); Wojciech Edward Suchta, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/385,673

(22) Filed: Jul. 26, 2021

(65) Prior Publication Data
US 2023/0022484 A1  Jan. 26, 2023

(51) Int. Cl.
*F16F 1/38* (2006.01)
*F16F 1/373* (2006.01)
*H02K 5/24* (2006.01)
*B60K 1/00* (2006.01)

(52) U.S. Cl.
CPC .............. *F16F 1/3842* (2013.01); *B60K 1/00* (2013.01); *F16F 1/3732* (2013.01); *H02K 5/24* (2013.01); *F16F 2224/025* (2013.01); *F16F 2230/0005* (2013.01)

(58) Field of Classification Search
CPC .................................................... F16F 1/3842
USPC ..................................................... 267/141.2
See application file for complete search history.

(56) References Cited

U.S. PATENT DOCUMENTS

| 4,728,086 A | 3/1988 | Ishiyama et al. |
| 5,299,790 A * | 4/1994 | Whightsil, Sr. ........ F16F 1/3849 267/292 |
| 6,435,486 B2 | 8/2002 | Maier |
| 7,367,551 B2 * | 5/2008 | Kumper ................... F16F 1/38 267/281 |

(Continued)

FOREIGN PATENT DOCUMENTS

| GB | 2027517 A * | 2/1980 | ............... B61G 9/08 |
| JP | 03084230 A * | 4/1991 | |

(Continued)

OTHER PUBLICATIONS

Machine translation of JP 03084230A (Year: 1991).*

(Continued)

*Primary Examiner* — Melanie Torres Williams
(74) *Attorney, Agent, or Firm* — Harness, Dickey & Pierce, P.L.C.

(57) ABSTRACT

A mount bushing includes an outer mounting ring adapted for connection to a mount structure. An outer structural ring is disposed inside of the outer mounting ring. A main elastomeric isolation arrangement is disposed between the outer structural ring and an inner structural insert, wherein the main elastomeric isolation arrangement is supported between the outer structural ring and the inner structural insert by elastomer material. An outer ring isolation layer of elastomer is disposed between the outer mounting ring and the outer structural ring, wherein the outer ring isolation layer is isolated from the main elastomeric isolation arrangement by the outer structural ring. A mounting bolt is inserted through a bore in the inner structural insert.

5 Claims, 4 Drawing Sheets

(56) References Cited

U.S. PATENT DOCUMENTS

| | | | |
|---|---|---|---|
| 7,922,156 B2* | 4/2011 | Goudie | F16F 13/103 |
| | | | 267/293 |
| 8,196,911 B2* | 6/2012 | Baumbarger | F16F 1/387 |
| | | | 267/293 |
| 8,967,598 B2 | 3/2015 | Whear et al. | |
| 2020/0096073 A1 | 3/2020 | Miyazaki et al. | |
| 2022/0032703 A1 | 2/2022 | Otsu | |

FOREIGN PATENT DOCUMENTS

| | | |
|---|---|---|
| JP | H08177918 A | 7/1996 |
| WO | WO-2006024426 A2 | 3/2006 |
| WO | WO-2019049752 A1 * | 3/2019 ........... B60G 21/052 |

OTHER PUBLICATIONS

U.S. Appl. No. 17/231,687, filed Apr. 15, 2021, Sam Jomaa.
First Office Action for Chinese Patent Application No. 202210390615.4 dated Apr. 3, 2023 with correspondence dated Apr. 23, 2023 from China Patent Agent (H.K.) Ltd summarizing content, 10 pages.

* cited by examiner

MOUNT BUSHING WITH INTEGRATED ISOLATED OUTER INSERT FOR ENHANCED HIGH FREQUENCY ISOLATION PERFORMANCE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a mount bushing with an integrated isolated insert for enhanced high frequency isolation performance. Electric vehicle drive units exhibit source energy with prevalent frequencies up to 3000 Hz. Propulsion mounts and supporting structure have to provide sufficient isolation for this expanded frequency range. Often, structural components of the mount assembly or the drive unit exhibit resonances in the frequency range of 300-2000 Hz that will require added Tuned Vibration Absorber (TVA) to mitigate these resonances, at significant added mass, cost, and packaging space. In addition, the drive unit motor may exhibit source energy at certain vibration orders that require enhanced isolation in the mounts.

SUMMARY

A mount bushing includes an outer mounting ring adapted for connection to a mount structure. An outer isolation mass ring is disposed inside of the outer mounting ring. A main elastomeric isolation arrangement is disposed between the outer structural ring and an inner structural insert, wherein the main elastomeric isolation arrangement includes an isolation mass formed as an annular ring that is supported between the outer structural ring and the inner structural insert by elastomer material. An outer ring isolation layer of elastomer is disposed between the outer mounting ring and the outer structural ring, wherein the outer ring isolation layer is isolated from the main elastomeric isolation arrangement by the outer structural ring. A mounting bolt is inserted through a bore in the inner structural insert.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 2:
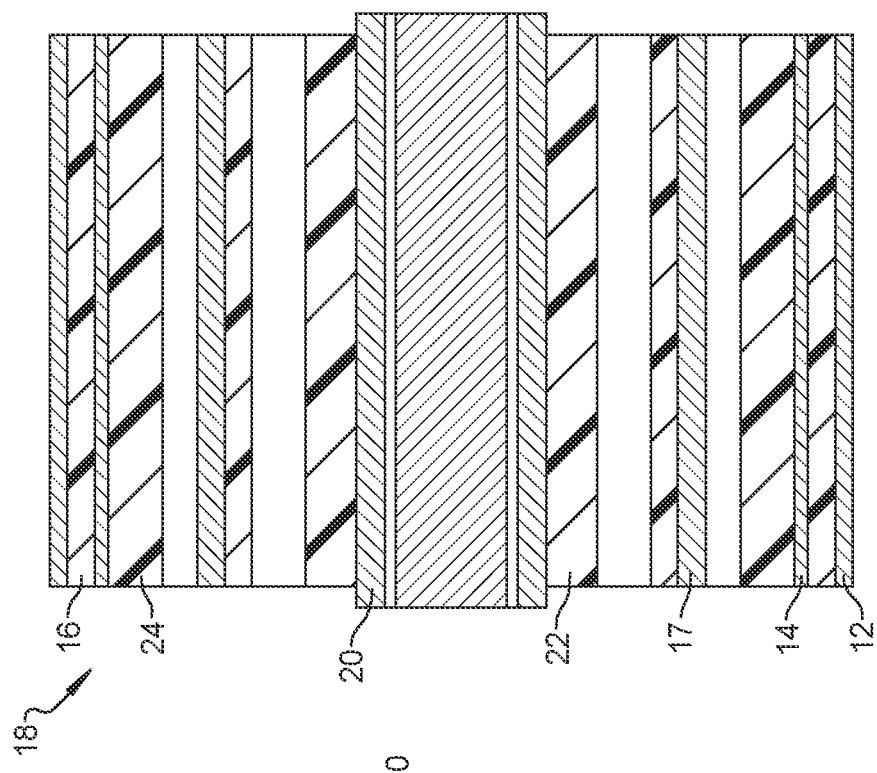
FIG. 2 is an axial cross-section view of the mount bushing according to the principles of the present disclosure.
Figure 1:
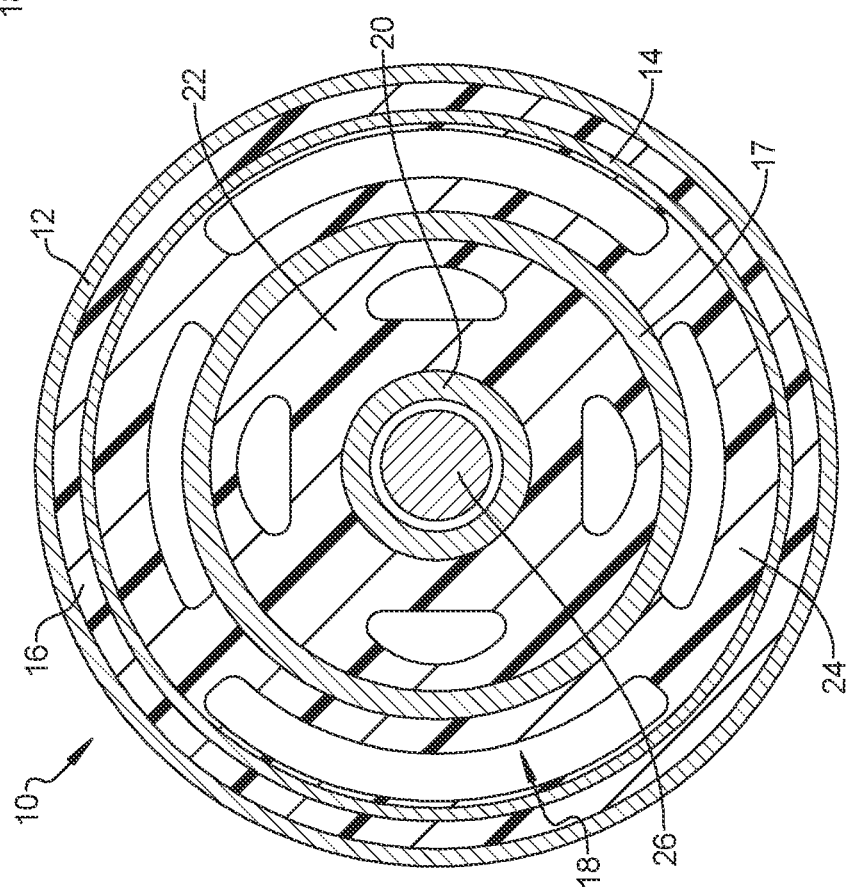
FIG. 1 is a radial cross-sectional view of a mount bushing according to the principles of the present disclosure.
Figure 5:
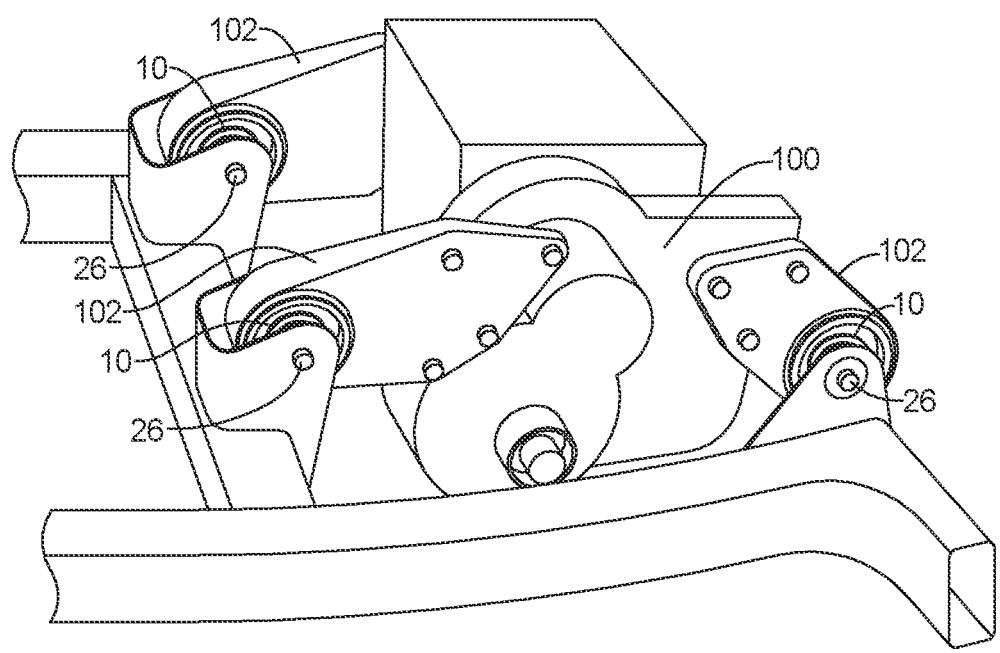
FIG. 5 is a schematic illustration of an exemplary electric vehicle drive unit and mount structure for use with the mount bushing according to the principles of the present disclosure.

With reference to FIGS. 1 and 2, a longitudinal and a lateral cross sectional view are shown of an exemplary mount bushing 10 according to the principles of the present disclosure. As shown in FIG. 5, the mount bushing 10 is designed for improved isolation of high frequency vibrations in a mount structure 102 for an electric vehicle drive unit 100 although the mount bushing 10 could be used in other applications. The mount bushing 10 includes an outer mounting ring 12 that is received in or integrally formed as part of a mount structure 102 that is adapted to be connected to an electric motor 100. An outer structural ring 14 is disposed inside the outer mounting ring 12. An outer ring isolation layer 16 is disposed between the outer mounting ring 12 and the outer structural ring 14. A main elastomeric isolation arrangement 18 is disposed between the outer structural ring 14 and an inner structural insert 20. The main elastomeric isolation arrangement 18 includes a mass element 17 supported by inner and outer rubber or other elastomeric portions 22, 24 for providing a double isolation arrangement which will be described in further detail herein with reference to FIG. 3. A mounting bolt 26 is inserted through the inner structural insert 20 for securing the inner structural insert 20 of the mount bushing 10 to a frame or chassis of a vehicle. The inner structural insert 20 and the outer structural ring 14 can have cylindrical and other shaped cross sections such as oval, square, rectangular, or irregular.

The length, thickness (general shape) and choice of material of the outer ring isolation layer 16 and the main elastomeric isolation arrangement 18 can be selected to provide a mount resonance at a specified frequency to achieve desired higher frequency vibration isolation. According to an exemplary embodiment, the outer ring isolation layer 16 can have a thickness of between 3 and 8 mm and can be made from natural rubber NR, high damping NR, synthetic rubber, silicone, or similar elastomers suitable for vibration isolation rubber that can be molded with or without voids between the outer mounting ring 12 and the outer structural ring 14.

The mount bushing 10 of the present disclosure provides an outer isolation layer and an outer structural ring that enhance high frequency isolation related to resonant modes of the mount supporting structural components (brackets) and/or general excitation energy from the drive unit. The mount bushing 10 utilizes part of the mass and structure of the bushing to create a mass-damper effect for high frequency isolation without adding significant additional mass or occupying additional package space. The concept can be utilized with any type of bushing design with minor modification to the internal components of the bushing. The improved mount bushing design 10 provides an outer structural ring 14 and an outer ring isolation layer 16 between the outer structural ring 14 and the outer mounting ring 12. The inner structural insert 20 functions as the support for the bushing assembly 10 to the mounting structure (vehicle frame or chassis). The mass of the bushing assembly 10 components attached to the inner structural insert 20 and outer ring 12 acts as a mass damper tuned for specific frequency to reduce vibration associated with the excitation energy.

Figure 3A:
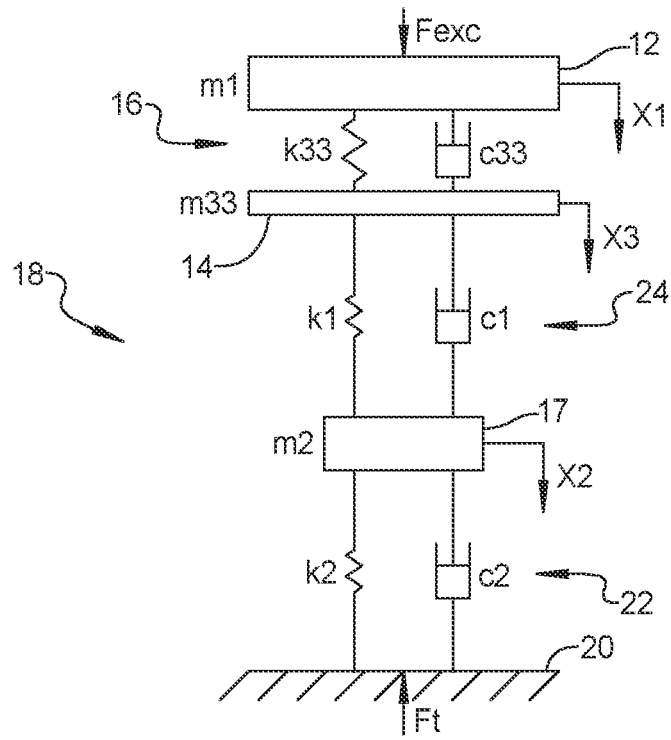
FIG. 3a is a schematic illustration of a double isolation mount with the integrated isolation ring according to the principles of the present disclosure without mount bracket effect.

With reference to FIG. 3*a*, the main elastomeric isolation arrangement 18 can be a double isolation arrangement such as is also shown in detail in FIGS. 1 and 2. FIG. 3*a* is a simplified one-dimensional representation of an actual mount that is otherwise three-dimensional and exhibits these characteristics in three orthogonal directions. The springs and dampers are lumped parameters of physical components of the mount for the sake of mathematical characterization. A single spring or a single damper can represent the function of multiple physical components of the mount acting singularly or in combination. The masses can represent several components. In particular, in the double isolation arrangement 18 as shown in FIG. 3*a*, exterior forces ($F_{exc}$) applied to the mass (m1) of the drive unit supported by the mount bushing 10 (as part of a mounting system with multiple bushings) are transmitted to the inner structural insert 20 by the outer isolation spring and damper element k33, c33 and by a pair of spring and damper elements k1, c1; k2, c2 each in a form of an elastomeric material such as rubber and an intermediate mass element 17. According to the principles of the present disclosure, the outer ring isolation layer 16 (k33, c33) has a thickness of between 3 and 8 mm and is designed to provide high frequency vibration isolation between the outer mounting ring 12 and the inner structural insert 20. The outer ring isolation layer 16 can be formed from rubber or other elastomeric material. The outer ring isolation layer 16 is isolated from the main elastomeric isolation arrangement 18 by the outer structural ring 14. In this example, the dynamic effect of the mount bracket structural mass and damping is not considered.

Figure 3B:
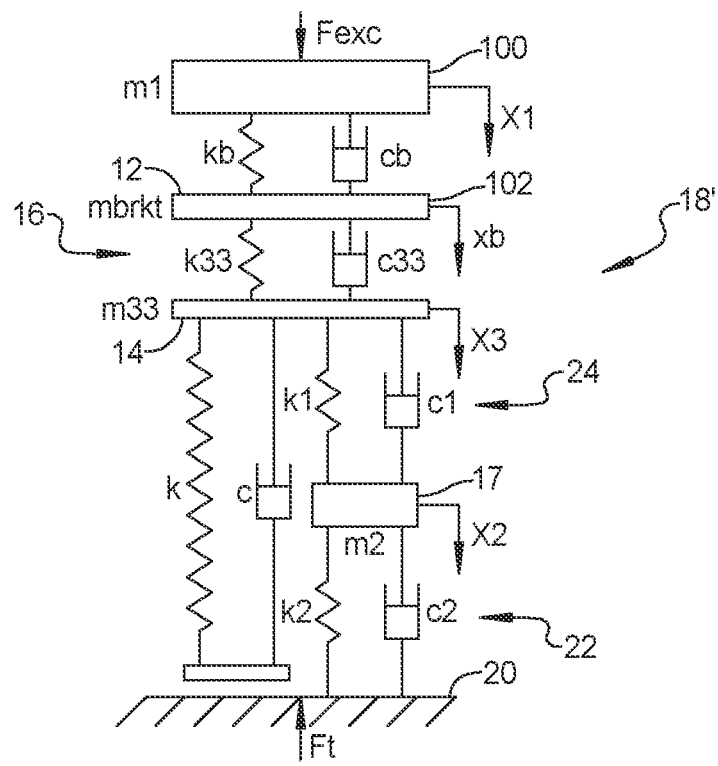
FIG. 3b is a schematic illustration of a load decoupled double isolation mount with the integrated isolation ring according to the principles of the present disclosure with mount bracket effect.

With reference to FIG. 3*b*, the main elastomeric isolation arrangement 18' can be a load-decoupled double isolation arrangement. It should also be understood that the main elastomeric isolation arrangement 18' can be a single isolation arrangement or other known type of isolation arrangement. FIG. 3*b* is a simplified one-dimensional representation of a motor mount bracket 102 and bushing assembly 10 that is otherwise three-dimensional and exhibits these characteristics in three orthogonal directions. The springs and dampers are lumped parameters of physical components of the mount for the sake of mathematical characterization. A single spring or a single damper can represent the function of multiple physical components of the mount acting singularly or in combination. The masses can represent several components. In particular, in the load decoupled double isolation arrangement 18' as shown in FIG. 3*b*, exterior forces ($F_{exc}$) applied to the mass (m1) of the drive unit 100 supported by a metal, nylon, or composite mount bracket 102 with a mass (mbrkt) and inherent spring and damper kb, cb characteristics and the mount bushing 10 (as part of a mounting system with multiple mount brackets and mount bushings) are transmitted to the inner structural insert 20 by the outer isolation spring and damper element k33, c33 and by both a single spring and damper arrangement k, c and a pair of spring and damper elements k1, c1; k2, c2 each in a form of an elastomeric material such as rubber and an intermediate mass element 17. According to the principles of the present disclosure, the outer ring isolation layer 16 (k33, c33) has a thickness of between 3 and 8 mm and is designed to mitigate support bracket 102 structural dynamics and provide high frequency vibration isolation between the electric drive unit 100 and the inner structural insert 20. The outer ring isolation layer 16 can be formed from rubber or other elastomeric material. The outer ring isolation layer 16 is isolated from the main elastomeric isolation arrangement 18' by the outer structural ring 14.

Figure 4:
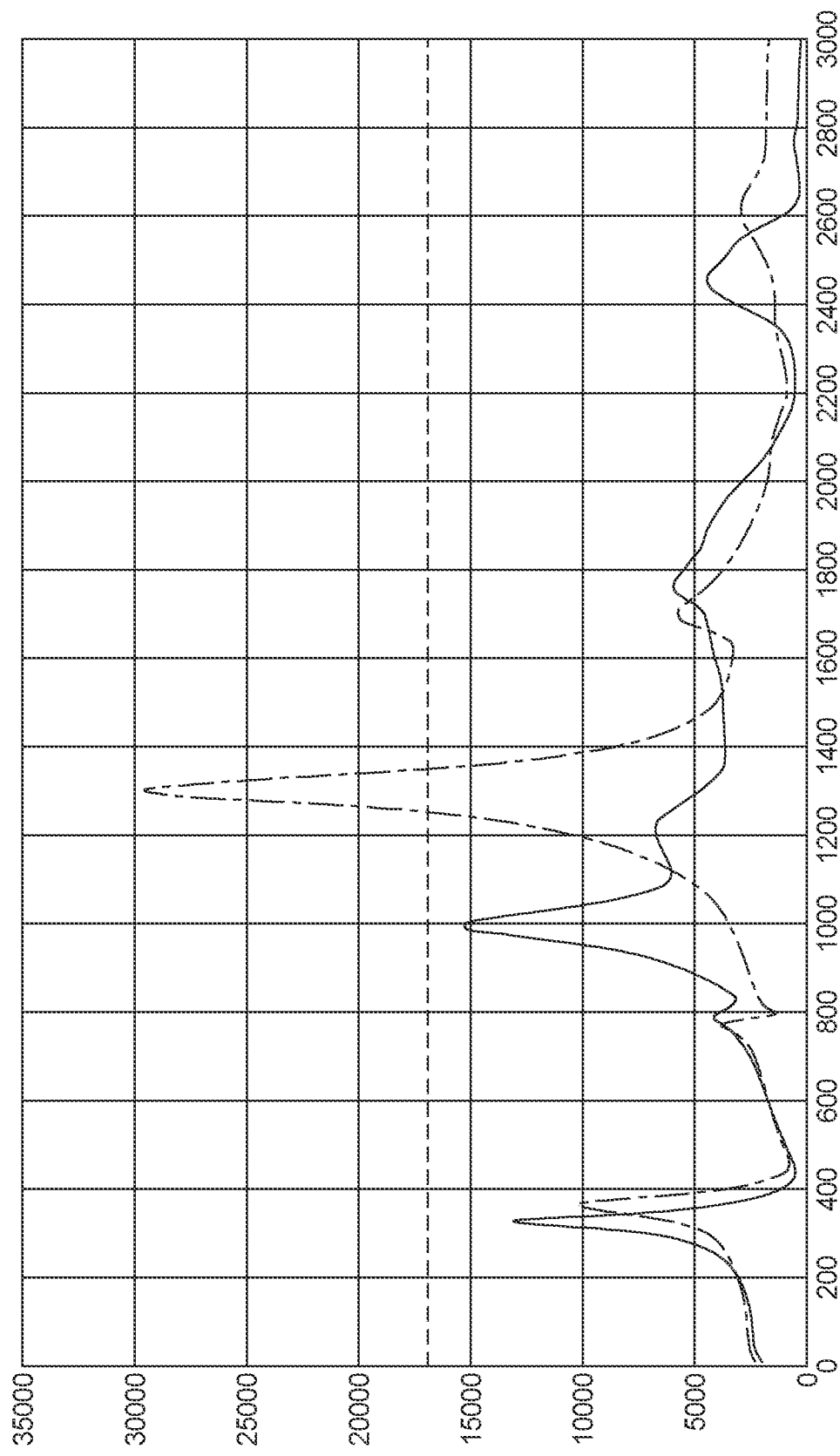
FIG. 4 is a graphical illustration of the dynamic stiffness verses frequency for exemplary mount bushings of FIG. 3b according to the principles of the present disclosure compared to traditional bushings.

With reference to FIG. 4, a graph of dynamic stiffness vs. frequency is shown illustrating the improved dynamic stiffness at high frequency of the isolation system shown in FIG. 3*b*, including the integrated outer structural ring 14 and outer ring isolation layer 16. In particular, the horizontal dashed line represents a target dynamic stiffness level for the bushing bracket system. The dot-dash line represents a baseline load decoupled double isolation arrangement without the outer structural ring 14 and the outer ring isolation layer 16 and showing the dynamic stiffness exceeding the target stiffness level in the 1200-1400 Hz frequency range. The solid line in FIG. 4 represents the load decoupled double isolation arrangement with the integrated outer structural ring 14 and outer ring isolation layer 16 as represented in FIG. 3*b* for providing improved dynamic stiffness within the design target range at high frequency. In this example, in the 1200-1400 Hz frequency ranges, the integrated outer structural ring 14 and outer ring isolation layer 16 of the present disclosure demonstrate reduced dynamic stiffness as compared to the load decoupled double isolation arrangement alone.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A mount bushing, comprising:
   an outer mounting ring adapted for connection to a mount structure;

an outer structural ring inside of the outer mounting ring;
a main elastomeric isolation arrangement disposed between the outer structural ring and an inner structural insert, wherein the main elastomeric isolation arrangement includes an isolation mass formed as an annular ring having a radial thickness greater than a radial thickness of the outer structural ring that is supported between the outer structural ring and the inner structural insert by an inner elastomeric portion interior to the isolation mass and an outer elastomeric portion exterior to the isolation mass, wherein the inner elastomeric portion and the outer elastomeric portion of the main elastomeric isolation arrangement each include openings therein;
an outer ring isolation layer of elastomer molded between the outer mounting ring and the outer structural ring, wherein the outer ring isolation layer is isolated from the main elastomeric isolation arrangement by the outer structural ring, wherein the outer ring isolation layer has a thickness of between 3 and 8 mm and wherein the inner elastomeric portion and the outer elastomeric portion each have a larger radial thickness than the outer ring isolation layer; and
a mounting bolt inserted through a bore in the inner structural insert.

2. The mount bushing according to claim 1, wherein the outer ring isolation layer is made from one of natural rubber NR, high damping NR, synthetic rubber and silicone.

3. The mount bushing according to claim 1, wherein the outer ring isolation layer of elastomer is molded between the outer ring and the outer structural ring.

4. An electric vehicle drive unit, comprising:
an electric motor;
a mount structure connected to the electric motor; and
a mount bushing supported by the mount structure and including:
an outer mounting ring connected to the mount structure;
an outer structural ring inside of the outer mounting ring;
a main elastomeric isolation arrangement disposed between the outer structural ring and an inner structural insert, wherein the main elastomeric isolation arrangement includes isolation mass formed as an annular ring having a radial thickness greater than a radial thickness of the outer structural ring and that is supported between the outer structural ring and the inner structural insert by an inner elastomeric portion interior to the isolation mass and an outer elastomeric portion exterior to the isolation mass, wherein the inner elastomeric portion and the outer elastomeric portion of the main elastomeric isolation arrangement each include openings therein;
an outer ring isolation layer of elastomer molded between the outer mounting ring and the outer structural ring, wherein the outer ring isolation layer is isolated from the main elastomeric isolation arrangement by the outer structural ring, wherein the outer ring isolation layer has a thickness of between 3 and 8 mm and wherein the inner elastomeric portion and the outer elastomeric portion each have a larger radial thickness than the outer ring isolation layer; and
a mounting bolt inserted through a bore in the inner structural insert.

5. The electric vehicle drive unit according to claim 4, wherein the outer ring isolation layer is made from one of natural rubber NR, high damping NR, synthetic rubber and silicone.

* * * * *